United States Patent [19]

Hänsel et al.

[11] Patent Number: 5,250,610
[45] Date of Patent: Oct. 5, 1993

[54] AQUEOUS POLYURETHANE DISPERSIONS AND THEIR USE AS LAMINATING ADHESIVES

[75] Inventors: Eduard Hänsel, Wuppertal; Walter Meckel, Neuss; Thomas Münzmay, Dormagen, all of Fed. Rep. of Germany

[73] Assignee: Bayer Aktiengesellschaft, Leverkusen, Fed. Rep. of Germany

[21] Appl. No.: 828,079

[22] Filed: Jan. 30, 1992

[30] Foreign Application Priority Data

Feb. 5, 1991 [DE] Fed. Rep. of Germany ....... 4103347

[51] Int. Cl.$^5$ ............................................. C08L 75/06
[52] U.S. Cl. ..................... 524/591; 524/845; 428/423.1; 528/71; 528/80
[58] Field of Search ....................... 524/591; 428/423.1

[56] References Cited

U.S. PATENT DOCUMENTS

| | | | |
|---|---|---|---|
| 3,412,054 | 11/1968 | Milligan et al. ...................... | 524/591 |
| 3,539,483 | 11/1970 | Keberle et al. ...................... | 524/840 |
| 3,983,058 | 9/1976 | Hirooka et al. ...................... | 524/591 |
| 4,172,191 | 10/1979 | Nachtkamp et al. ................. | 528/61 |

FOREIGN PATENT DOCUMENTS

| | | |
|---|---|---|
| 340586 | 11/1989 | European Pat. Off. . |
| 424697 | 5/1991 | European Pat. Off. . |
| 1495745 | 9/1963 | Fed. Rep. of Germany . |
| 1913271 | 9/1970 | Fed. Rep. of Germany . |
| 1058339 | 2/1967 | United Kingdom . |
| 1076688 | 7/1967 | United Kingdom . |
| 1128568 | 9/1968 | United Kingdom . |
| 1411858 | 10/1975 | United Kingdom . |
| 1442569 | 7/1976 | United Kingdom . |

OTHER PUBLICATIONS

Chemical Abstracts, vol. 111, No. 20, Nov. 13, 1989, Abstract No. 175190z.
Chemical Abstracts, vol. 114, No. 6, Feb. 11, 1991, Abstract No. 44470e.

*Primary Examiner*—John Kight, III
*Assistant Examiner*—R. Johnson
*Attorney, Agent, or Firm*—Joseph C. Gil; Godfried R. Akorli

[57] ABSTRACT

The present invention relates to aqueous polyurethane dispersions based on

- A) a relatively high molecular weight polyhydroxyl component containing carboxylic acid groups,
- B) optionally another relatively high molecular weight polyhydroxyl component which is substantially free of carboxylic acid groups,
- C) optionally low molecular weight polyhydroxyl compounds as chain lengthening agents,
- D) organic polyisocyanates and
- E) a neutralizing agent capable of converting the carboxylic acid groups into carboxylate groups, the dispersions are characterized in that the carboxyl group-containing relatively high molecular weight polyhydroxyl component A) is the esterification product of a polyether polyol a1) in the molecular weight range of from 400 to 5000, with a polycarboxylic acid a2); the dispersions are useful as laminating adhesives.

3 Claims, No Drawings

AQUEOUS POLYURETHANE DISPERSIONS AND THEIR USE AS LAMINATING ADHESIVES

BACKGROUND OF THE INVENTION

1. Field of the Invention

The function of laminating adhesives is to join together very fine films of different or identical materials, e.g., polyethylene, polypropylene, polyester, polyamide, aluminum, paper or cardboard to form composite films used for many different purposes, e.g., for packaging or for decorative purposes. A suitable laminating adhesive is expected to provide excellent bonds on numerous substrates with only a small application of adhesive.

Further, a suitable laminating adhesive must be economically processible, i.e., it must be suitable for application in conventional processing machines (e.g., BILLHÖFER under the usual operating conditions, illustrative of which are low drying temperatures and high conveyor belt speeds. According to the present state of the art, suitability is attained by means of solvent-containing one-component or multi-component systems. The organic solvents released in the course of processing constitute a problem to the adhesives processor, as he must use expensive suction devices for removal of the solvents and plants for the recovery or burning of the solvents.

It was therefore an object of the present invention to provide solvent-free aqueous polyurethane dispersions as laminating adhesives which would not have the above mentioned disadvantages of laminating adhesives containing solvents.

2. Brief Description of the Prior Art

Numerous processes for the preparation of polyurethanes containing carboxylate groups are known. Thus, for example, conventional prepolymers containing isocyanate end groups may be reacted with aqueous solutions of amino carboxylic acids or their salts in an organic solvent to form the corresponding polyurethane ureas containing carboxylate groups (see e.g., DE-AS 1 495 745, GB-PS 1 076 688, U.S. Pat. No. 3,539,483). The disadvantage of this process is that the polymer can only be synthesized in the presence of organic solvents which remain in the end product or must be removed from the end product by distillation, which entails an increase in the manufacturing costs.

According to another process, dimethylpropionic acid may be used as chain lengthening agent for synthesizing polyurethanes so that the free carboxyl groups are, to a large extent preserved, and the product may then be neutralized (see e.g., U.S. Pat. No.3,412,054, DE-OS 1 913 271).

Although the incorporation of dimethylpropionic acid in isocyanate prepolymers can be carried out without the use of solvents, the problem in many cases arises from how to dissolve the dimethylpropionic acid in the prepolymer at the required low reaction temperatures. Another disadvantage is that dimethylpropionic acid can only be incorporated by an isocyanate reaction, which results in relatively high viscosities of the resulting modified isocyanate prepolymers.

Although esters containing both hydroxyl groups and free carboxyl groups are known from the chemistry of dispersible ester resins (see e.g., DT-OS 2 323 546, U.S. Pat. No. 4,029,617, BE-PS 803 346 or U.S. Pat. No. 3,876,582), the reactive groups are randomly distributed in the resultant products in such a manner that structurally defined and in particular predominantly linear polyurethanes cannot be produced on the basis of these known products.

According to another known process, polyurethanes containing free primary or secondary amino groups are reacted with β-propiolactone or the anhydride of a dicarboxylic acid so that a modification of the polyurethane with free carboxyl groups takes place (see DT-AS 1 237 306).

The use of polyethers or polyesters containing terminal OH groups and sulphonate or carboxylate groups in side chains for the preparation of anionic polyurethane dispersions has also been described (see e.g., DT-AS 1 570 615).

The use of diamines containing sulphonate or carboxylate groups has been considered for the preparation of polyesters containing anionic groups in side chains (see e.g., DT-AS 1 570 615).

The use of trimellitic acid derivatives for introducing carboxylic acid groups into polyurethanes has also been described (EP 0 000 171), see also O. Lorenz et al., Agnew. Makromol.Chem.63 (1977) 11-22. According to the described process, trimellitic acid anhydride is first esterified with a macroglycol in such a manner that only the anhydride ring is opened. 50 mol-% of the remaining carboxylic acid groups are then converted into alkali metal or tertiary ammonium salts and the remaining carboxylic acid and hydroxyl groups are converted into an isocyanate prepolymer by a reaction with polyisocyanates.

A disadvantage of this process is the high proportion of basic groups, tertiary amines or carboxylic acid anions in the presence of isocyanate groups. As known e.g., from E. Müller in Houben-Weyl, Methoden der organischen Chemie, 14/2, p 82, Georg Thieme Verlag, Stuttgart 1963 and J. H. Saunders and K. G. Frisch: Polyurethanes Chemistry and Technology I in High Polymers vol XVI, Wiley Interscience, New York, 1962, such basic groups catalyze the reaction of isocyanate groups with hydroxyl groups of alcohols and carboxylic acids to form urethane or acid amide groups but they also, at the same time, catalyze the trimerization reaction of isocyanates to form isocyanuric acid derivatives, which may lead to an uncontrolled increase in the functionality and hence gelling of the prepolymer. The use of such catalytically active components always entails an uncertainty factor in the reaction of polyisocyanates carried out on a technically relevant scale.

SUMMARY OF THE INVENTION

This invention relates to aqueous polyurethane dispersions based on:
  A) a relatively high molecular weight polyhydroxyl component containing carboxylic acid groups,
  B) optionally another relatively high molecular weight polyhydroxyl component which is substantially free from carboxylic acid groups,
  C) optionally low molecular weight polyhydroxyl compounds as chain lengthening agents,
  D) organic polyisocyanates and
  E) a neutralizing agent capable of converting the carboxylic acid groups into carboxylate groups;
characterized in that the relatively high molecular weight, carboxyl group-containing polyhydroxyl component A) is the esterfication product of a polyether polyol a1) in the molecular weight range of from 400 to 5000, preferably from 500 to 2000, with a polycarboxylic acid a2). The invention also relates to the use of the dispersions as laminating adhesives.

DETAILED DESCRIPTION OF THE INVENTION

The relatively high molecular weight polyhydroxyl components A) containing carboxylic acid groups used according to the invention are esterification products of relatively high molecular weight polyoxyalkylene polyols a1) and polycarboxylic acids a2) having an acid number of from 10 to 80, preferably from 25 to 65, and a hydroxyl group number of from 25 to 200, preferably from 45 to 120. The polyoxyalkylene polyols a1) used herein are preferably polymerization products of ethylene oxide, propylene oxide, butylene oxide or their copolymers and graft polymers or the polyethers obtained by the condensation of polyhydric alcohols or mixtures thereof and those obtained by the alkoxylation of polyhydric alcohols, amines or amino alcohols. Homo and/or copolymers of ethylene oxide and/or propylene oxide in the molecular weight range of from 400 to 2000 having an average functionality of from 2 to 3 are particularly preferred. The polycarboxylic acids a2) used herein are preferably aliphatic or aromatic di- and/or tricarboxylic acids or their anhydrides, e.g., oxalic, succinic, adipic, suberic, azaleic, sebacic, dodecanedicarboxylic, o-phthalic, terephthalic or isophthalic acid or tricarboxylic acids such as trimellitic or trimesic acid.

The relatively high molecular weight polyhydroxyl components B) optionally used herein may be polyhydroxyl components known from polyurethane chemistry, selected from the group consisting of polyoxyalkylene, polyester, polylacetone and polycarbonate polyols. Preferred polyhydroxyl components B) are homo and-/or copolymers of ethylene oxide and/or propylene oxide in the molecular weight range of from 400 to 5000, preferably from 1000 to 3000, having an average functionality of from 2 to 3. Polyester polyols are also preferred polyhydroxyl components B), in particular linear polyester diols or slightly branched polyester polyols in the molecular weight range of from 400 to 5000, preferably from 1000 to 3000. Examples thereof are obtained in known manner from aliphatic, cycloaliphatic or aromatic dicarboxylic acids, e.g., succinic, adipic, suberic, azaleic, sebacic, o-phthalic, terephthalic, isophthalic or hexahydrophthalic acid or mixtures thereof, and polyhydric, in particular dihydric alcohols, e.g., ethylene glycol, diethylene glycol, 1,4-butanediol, 1,6-hexanediol, 1,8-octanediol, neo-pentyl glycol or mixtures thereof, optionally together with small quantities of higher functional polyols such as trimethylol propane or glycerol. The polyhydric alcohols may, of course, also be cycloaliphatic and/or aromatic di- and polyhydroxyl compounds. Instead of free carboxylic acids, the corresponding polycarboxylic acid anhydrides or corresponding polycarboxylic acid esters of lower alcohols or mixtures thereof may be used for the preparation of the polyesters.

The starting components C) also, optionally used in the process according to the invention are preferably divalent to trivalent, in particular divalent polyhydroxyl compounds in the molecular weight range below 400, preferably from 62 to 250. Examples of the low molecular weight polyhydroxyl compounds C) optionally used include simple polyhydric alcohols such as ethylene glycol, propylene glycol, 1,3-propanediol, 1,4-butanediol, 1,6-hexanediol, trimethylol propane or glycerol. Low molecular weight polyesterdiols, e.g., adipic acid-bis-(hydroxyethyl)-ester, or low molecular weight diols containing ether groups, e.g., diethylene glycol, triethylene glycol, tetraethylene glycol, dipropylene glycol, tripropylene glycol or tetrapropylene glycol, may also be used as component C).

Examples of suitable polyisocyanate components D) include aliphatic, cycloaliphatic, araliphatic and aromatic polyisocyanates as described e.g., by W. Siefken in Justus Liebigs Annalen der Chemie, 562, pp. 75-136. Aliphatic, cycloaliphatic and araliphatic diisocyanates are preferred, e.g., 1,6-hexamethylene diisocyanate, 1,4-diisocyanatocyclohexane, 1-isocyanto-3,3,5-trimethyl-5-isocyantomethyl-cyclohexane (isophorone diisocyanate), 4,4'-diisocyanato-dicyclohexyl methane and xylylene diisocyanate, and aromatic diisocyanates, e.g., the isomers of tolylene diisocyanate or the isomers of diphenylmethane diisocyanate.

The neutralizing agents E) used according to the invention are preferably tertiary amines, e.g., triethylamine, tri-n-butylamine or triisopropanolamine. Ammonia is another preferred neutralizing agent E). Inorganic bases may also be used as neutralizing agents E) according to the invention, e.g., alkali metal hydroxides such as sodium or potassium hydroxide or alkali metal carbonates or bicarbonates.

Additives conventionally used in the processing of adhesives may also be added to the dispersions of laminating adhesives according to the invention, e.g., levelling agents, defoamants, viscosity regulators, cross-linking agents, catalysts, etc.

Preparation of the aqueous polyurethane dispersions is generally carried out by preparing an isocyanate terminated prepolymer from the isocyanate reactive components A) to C) and the isocyanate component D) by known processes of polyurethane chemistry and then ionizing this prepolymer with the neutralizing agent E) either solvent-free or in the presence of a solvent and then converting the product into an aqueous dispersion by the addition of water. Auxiliary solvents used herein may in particular be low boiling, water miscible solvents, e.g., ketones or cyclic ethers such as acetone, methylethyl ketone, tetrahydrofuran or dioxane, which can easily be removed from the aqueous dispersion by vacuum distillation. Higher boiling solvents which remain in the aqueous dispersion as co-solvents may, of course, also be used as auxiliary solvents. Further, the neutralizing agent E) may, of course, be used in the form of an aqueous solution, in which case it is particularly advantageous to carry out dispersion at the same time to form the aqueous polyurethane dispersion.

The following examples serve to illustrate the process according to the invention but by no means to limit it.

The average particle sizes of the polyurethane dispersions were determined by laser correlation spectroscopy (apparatus: Malvern Autosizer II, Malvern Inst. Limited).

The viscosities are indicated in terms of the outflow times determined according to DIN 53 211, using a 4 mm DIN cup.

The subject of the invention will now be further explained with the aid of the following examples.

The following Examples are intended to illustrate the process according to the invention without limiting it in any way (percentages are by weight, unless otherwise stated).

EXAMPLES

Examples 1 to 3

The quantities of a propylene oxide polyol I shown in Table 1 were introduced into a heatable reaction vessel equipped with stirrer and nitrogen inlet and heated to 100° C. under a constant, weak stream of nitrogen. Polycarboxylic acid anhydride II was added as shown in Table 1 and the reaction mixture was heated to 150° C. Esterification was continued with a slow rise in temperature to 200° C. until the desired acid number (SZ, Table 1) was reached.

| Example | propylene oxide 1 | | acid anhydride II | | Ester diol | |
|---|---|---|---|---|---|---|
| | functionality | OH-number | | | SZ | OH-number |
| 1 | 2 | 112 | Trimellitic acid | 192 g | 23–27 | 55–60 |
| | | 2000 g | | | | |
| 2 | 2 | 265 | Trimellitic acid | 384 g | 50–55 | 110–120 |
| | | 859 g | | | | |
| 3 | 3 | 355 | o-Phthalic acid | 296 g | 85–90 | 170–180 |
| | | 950 g | | | | |

Example 4

200 g of the ester diol from Example 1 (OH number 58) were reacted with 29.5 g of hexamethylene diisocyanate at 40° C. The isocyanate content was 2.84% after 3.5 hours. 8.7 g of triethylamine were incorporated and the reaction mixture was then dispersed with 535 g of deionized water. A finely divided, stable dispersion having the following data was obtained:

| | |
|---|---|
| Solids content: | 32% by weight |
| Viscosity (DIN 4 mm): | 12 (s) |
| Particle size: | 180 (nm) |

Example 5

217.0 g of the ester diol from Example 1 (OH number 58) and 1.8 g of butanediol-(1,4) were reacted with 23.5 g of hexaniethylene diisocyanate and 12.5 g of 4,4'-diphenyl methane diisocyatiate at 40° C. A constant isocyanate content of 2.29% was obtained after 2 hours. 14.0 g of triisopropanolamine were incorporated and the product was then dispersed with 615 g of deionized water. A finely divided, stable dispersion having the following data was obtained:

| | |
|---|---|
| Solids content: | 31% by weight |
| Viscosity (DIN 4 mm) | 25 (s) |
| Particle size: | 95 (nm). |

Example 6

211.0 g of the ester diol from Example 2 (OH number 119) were reacted with 60.5 g of hexamethylene diisocyanate at 50° C. A constant isocyanate content of 4.25% was obtained after 4 hours. 16.0 g of triisopropanolamine were incorporated and the product was then dispersed with 635 g of deionized water. A finely divided, stable dispersion having the following data was obtained:

| | |
|---|---|
| Solids content: | 32% by weight |
| Viscosity (DIN 4 mm): | 17 (s) |
| Particle size: | 160 (nm). |

Example 7

200.0 g of a linear polypropylene oxide diol (OH number 56) and 105.5 g of the ester diol from Example 2 (OH number 119) were reacted with 60.5 g of hexamethylene diisocyanate at 70° C. A constant isocyanate content of 3.27% was obtained after 5 hours. 18.1 g of triisopropanolamine were incorporated and the product was then dispersed with 855 g of deionized water. A finely divided, stable dispersion having the following data was obtained:

| | |
|---|---|
| Solids content: | 32% by weight |
| Viscosity (DIN 4 mm) | 17 (s) |
| Particle size: | 160 (nm). |

Example 8 (Example of practical application)

A lacquered cardboard (Chromolux Colour 77 (black) or 48 (white) of Zander) was laminated to a biaxially orientated polypropylene film (BOPP-Walothen 015 AZ, Wolff-Walsrode) in a conventional laminating machine under conventional operating conditions. A dispersion according to Example 5 was used as laminating adhesive.

| 1. Conditions | | | |
|---|---|---|---|
| Laminating roller | Drying roller | Laminating speed | Cardboard Chromolux-Color |
| a) 45° C. | 55° C. | 15 m/min | 77 |
| b) 60° C. | 55° C. | 20 m/min | 77 |
| c) 70° C. | 55° C. | 20 m/min | 48 |

| 2. Evaluation | | |
|---|---|---|
| Quantity applied (g/m$^2$) | Peeling resistance* (N/15 min) | Gloss** 20°/60°/80° |
| a) <2 | 2.3 | 70/90/95% |
| b) <1.5 | 2.4 | 60/90/95% |
| c) <1.5 | 3.5 | 70/90/95% |

*T-peeling test based on DIN 53 273
stripping angle: 180 (°)
stripping speed: 100 (mm/min)
length of stripping path: 100 (mm)
**Gloss measuring apparatus: laboratory reflectometer RL. Lange GmbH, Berlin, measuring angle: 20°, 60°, 80°.

The composites obtained show good bonding with an extremely small amount of adhesive and have a high gloss.

Although the invention has been described in detail in the foregoing for the purpose of illustration, it is to be understood that such detail is solely for that purpose and that variation can be made therein by those skilled in the art without departing from the spirit and scope of the invention except as it may be limited by the claims.

What is claimed is:

1. An aqueous polyurethane dispersion based

A) on a high molecular weight polyhydroxyl component containing carboxylic acid groups, B) optionally another high molecular weight polyhydroxyl component which is substantially free of a carboxylic acid group, C) optionally a low molecular weight polyhydroxyl compound as a chain lengthening agent, D) an organic polyisocyanate and E) a neutralizing agent capable of converting the carboxylic acid groups into carboxylate groups, characterized in that the high molecular weight polyhydroxyl component containing carboxylic acid groups A) is the esterification product of a polyether polyol a1) in the molecular weight range of from 400 to 5000, and polycarboxylic acid a2) which is characterized in that said component a2) is trimellitic acid or trimellitic acid anhydride.

2. The process for bonding flat materials or workpieces selected from the group consisting of a cardboard, paper, synthetic resin film and metal foil to one another comprising applying the aqueous polyurethane dispersion according to claim 1 to the surface of at least one of the materials or workpieces and contacting said surface with a surface of another material or workpiece having the aqueous polyurethane dispersion optionally applied thereto.

3. A composite which is produced by the process of claim 2.

* * * * *